United States Patent Office 3,355,479
Patented Nov. 28, 1967

3,355,479
PROCESS FOR PRODUCING AROMATIC NITRILES
Taijiro Oga, Hideo Ichinokawa, and Masatomo Ito, Ohta-ku, Tokyo, Japan, assignors to Showa Denko Kabushiki Kaisha, Tokyo, Japan, a corporation of Japan
No Drawing. Filed Oct. 19, 1964, Ser. No. 404,941
Claims priority, application Japan, Oct. 22, 1963, 38/55,939
6 Claims. (Cl. 260—465)

ABSTRACT OF THE DISCLOSURE

A process for the production of aromatic nitriles by ammoxidation of an alkyl or alkenyl substituted benzene using a catalyst composition consisting essentially of an oxide of arsenic and an oxide of vanadium supported on an inert carrier.

This invention relates to an improved process for producing from alkyl- and/or alkenyl-substituted benzenes corresponding aromatic nitriles. More particularly, it relates to a process for the manufacture of aromatic nitriles by the catalytic reaction of a gaseous mixture comprising (1) alkyl- and/or alkenyl-substituted benzenes or their derivatives whose nucleus is substituted by halogen or cyano group, (2) ammonia and (3) molecular oxygen-containing gas on a catalyst which contains oxide of arsenic and oxide of vanadium as active components.

It has previously been known to manufacture aromatic nitriles by the catalytic reaction of a gaseous mixture containing alkyl- and/or alkenyl-substituted aromatic hydrocarbon, ammonia and oxygen in the presence of an appropriate catalyst such as one used in the production of maleic acid anhydride or phthalic acid anhydride by the catalytic oxidation of benzene or naphthalene in a gaseous phase. Though the intended nitriles can be obtained in considerable yields by using such a method, there is an accompanying unusual decomposition reaction induced by excessive oxidation owing to unsuitable activity of said catalyst, and so the by-production of colouring substances or hydrogen cyanide is unavoidable. Accordingly, the purification of the resulting nitriles or the removal or recovery of a by-produced hydrogen cyanide constitutes an important problem. Furthermore, large excess of ammonia ought to be used when such catalyst is employed, because an excess decomposition of ammonia takes place. In addition, the yield of the reaction product is low on the basis of ammonia, and it involves an economic problem. In other words, since most of the cost for raw materials is spent for aromatic hydrocarbons and ammonia, which are the starting materials, the loss of ammonia caused by the unusual decomposition cannot be neglected from an economical point of view.

With these problems in mind, we have made extensive researches and found a surprising fact in the manufacture of aromatic nitriles in accordance with the reaction of this invention. Namely, we have found that a catalyst composed of oxide of arsenic and an appropriate amount of oxide of vanadium exhibits a suitable activity in a reaction to form nitriles, which activity can neither be obtained by oxide of arsenic or oxide of vanadium alone nor can it be expected from the fact than an arsenic compound has hitherto been regarded as deteriorating the activity of a vanadium catalyst, owing to its action as a catalyst poison (for instance, refer to P. H. Emmett, "Catalysis," vol. 1, p. 306, Reinhold Publishing Corp., New York, 1954). It has thus become possible to improve the selectivity of alkyl- and/or alkenyl-substituted aromatic hydrocarbons to nitriles, and simultaneously to control the occurrence of excess decomposition of ammonia and thus to enhance its selectivity to nitriles remarkably.

The above-mentioned excellent action of a catalyst having said composition gives a marked decrease of the formation of colouring substances and of a by-production of hydrogen cyanide. Therefore, there is less danger which comes from toxicity or polymerisation of a by-produced hydrogen cyanide, and thus the safety during the operation is remarkably improved. Furthermore, because of a marked decrease of the contamination of the reaction product, the removal of impurities has become easy. Consequently, it is possible to obtain nitriles having a high purity by applying a simple purification step.

We have also found that, by adding a suitable quantity of hydroxide or salt of alkali metal to a catalyst which contains oxide of arsenic and oxide of vanadium, it is possible to control a by-production of carbon dioxide and to prolong the life of the catalyst.

An object of this invention is to provide an improved process for producing aromatic nitriles with an excellent control of side-reaction which comprises subjecting alkyl and/or alkenyl substituted benzenes or their derivatives whose nucleus is substituted by halogen or cyano group to "ammoxidation reaction" in the presence of a new catalyst whereby the yield of the reaction product becomes high, not only on the basis of ammonia but said substituted benzenes.

The process in accordance with this invention comprises contacting at an elevated temperature a gaseous mixture containing at least one of said substituted benzene, ammonia and molecular oxygen-containing gas with a catalyst composition, the active component of which consists essentially of oxide of arsenic and oxide of vanadium, or with a catalyst composition prepared by incorporating hydroxide or salt of alkali metal in said composition.

The catalyst may be prepared by using oxide of arsenic and oxide of vanadium. It may also be prepared in the same method by using substances which may be converted to an oxide by heating it in the presence of an oxygen-containing gas like air. These are, for example, metallic arsenic and vanadium, or compounds of arsenic and vanadium such as their oxyacids, ammonium salts, oxychlorides and halides.

An appropriate method of preparing a catalyst comprises adding a suitable amount of the conventional carrier such as diatom earth, pumice, alumina, magnesia, titania, silicon carbide, asbestos and clay (such as bauxite, kaolin and bentonite) to an aqueous solution mixture of a suitable amount of arsenic oxide or oxyacid of arsenic with ammonium meta-vanadate or vanadyl chloride, or to an aqueous solution of ammonia, thereby to support the latter by the former, and thereafter heating the mixture in an oxygen-containing gas such as air.

The atomic ratio of arsenic to vanadium in the catalyst can be varied in a moderately broad range, for instance, 5:1 to 1:3, but a catalyst which contains arsenic and vanadium in a proportion outside said range may also be used. When a carrier is used for supporting, it is preferable that the amount of oxide of arsenic should be in the range of 0.5 to 20% by weight calculated as arsenic based on the total weight of the catalyst.

As already explained, it has been found that a catalyst composition consisting of oxide of arsenic and that of vanadium is a good catalyst having a suitable activity. It has also been found that the use of a catalyst composed of said catalyst composition and a suitable amount of alkali metal compound may result not only in the excellent control of a side-reaction which unfavourably invites the conversion into carbon dioxide during the formation of nitriles but also in the prevention of lowering catalytic activity which has been a problem to be solved in a long-time operation.

The "alkali metal compounds" used herein include hydroxide, salt of mineral acid such as sulphate, phosphate, chloride and borate of alkali metal and sulphide or salt of organic acid of alkali metal which can be converted to salt of mineral acid or oxide upon oxidative calcination, said alkali metal being such as lithium, sodium, potassium, rubidium and cesium.

By adding such alkali metal compound to an aqueous solution or ammonium aqueous solution of a mixture of arsenic compound and vanadium compound, as another embodiment of this invention, it is possible to obtain a catalyst composition comprising oxide of arsenic, oxide of vanadium and alkali metal compound.

The amount of said alkali metal compound to be added depends somewhat upon its type, but can be chosen within a broad range. It is preferable to adopt the range of 0.1 to 5 in terms of atomic ratio to arsenic.

The catalyst in accordance with this invention has a suitable activity and can be used as a fixed bed, a fluidized bed or a coating applied on the inner surface of a tubular reactor.

The alkyl- and/or alkenyl-substituted benzene used as a starting material in this invention is preresented by the formula:

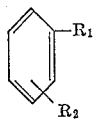

(wherein $R_1$ shows a lower alkyl group or a lower alkenyl group; $R_2$, hydrogen atom, a lower alkyl group, a lower alkenyl group or a cyano group; and the nucleus may further be substituted by halogen atom).

The lower alkyl group includes methyl, ethyl, propyl or isopropyl group; the lower alkenyl group includes ethenyl, propenyl, isopropenyl group; and halogen includes fluorine, chlorine, etc.

Examples of the nitrile obtained by the process of this invention are benzonitrile (from toluene, ethylbenzene or styrene), para-chlorobenzonitrile (from para-chlorotoluene), 2,6 - dichlorobenzonitrile (from 2,6 - dichlorotoluene), isophthalonitrile (from meta-tolunitrile), isophthalonitrile and meta-tolunitrile (from meta-xylene), terephthalonitrile and para-tolunitrile (from para-xylene, para-cymene), and phthalonitrile, phthalimide and ortho-tolunitrile (from ortho-xylene). It is of course possible to use these mixed hydrocarbons in optional combinations. In this case, a mixture of the corresponding nitriles is obtained. For instance, the use of a mixture of meta-xylene and para-xylene can give isophthalonitrile, terephthalonitrile, and a small quantity of tolunitriles corresponding to both of starting materials.

The concentrations of alkyl- and/or alkenyl-substituted benzenes in the gaseous mixture varies according to its type but may be selected within a broad range. When air is used as a source of oxygen, said concentration should preferably be in the range of 0.5 to 10% by volume.

Even when ammonia is used in a theoretical concentration in the reaction of the gaseous mixtures, i.e., one mole of ammonia to one mole of alkyl group or alkenyl group contained in the substituted benzene, nitriles are obtained in good yields, but particularly preferable concentration is about twice the theoretical amount. Ammonia may safety be used in excess of said amount. The excess ammonia undergoes little loss by oxidation, and most of it is recovered and re-used. This is one of the big advantages of this invention in comparison with the conventional method in which excess ammonia in an amount as large as more than twice the theoretical amount, for instance 4 times or more, is regarded as desirable and the loss of ammonia by oxidation is considerably great. Specifically, in the practice of the conventional method, the yield of nitrile based on the consumed ammonia is generally about 30 to 40%, whereas in accordance with the process of this invention, the yield can easily reach 60 to 75%.

The concentration of oxygen in the gaseous reaction mixture should preferably be at least 1.5 times the theoretical ratio for a stoichiometric reaction to form nitriles. As the stoichiometrical amounts of oxygen are, for example, 1.5 moles per 1 mole of toluene in the manufacture of benzonitrile from toluene, 3 moles in the manufacture of phthalonitrile from xylene and 4.5 moles in the manufacture of benzonitrile from cumene, the amount in actual operation should preferably be 2.25 moles, 4.5 moles and 6.25 moles, respectively. In any case, the upper limit is about 50 moles.

Air can be used as a source of oxygen. It is possible to use oxygen mixed with any other gases inert to the reaction. Usually, however, air will be most advantageous from an economical point of view.

The reaction is carried out at a temperature in the range of 250 to 500° C. The yield is not good when reaction temperature is held below 250° C. or above 500° C. The more preferable range is from 300 to 450° C. The reaction temperature is optionally chosen within said range in accordance with the conditions such as the type of the used substituted benzene, its concentration or the contact time. The contact time of the reaction is different depending upon other reaction condition, such as temperature. But generally, it may vary over a considerably wide range. The most suitable contact time is over the range from 0.5 to 10 seconds.

The intended nitrile is recovered from the thus produced gas by any optional conventional method. For instance, the resulting gas is conducted successively through an air-cooling condenser, a water-cooling condenser, an ice-cooling trap, a Dry Ice trap, etc. The formed nitrile is thus recovered as liquid or solid upon condensation or solidification.

This invention will now be illustrated by the following examples. It should be understood that the following examples will not confine the scope of the claims of this invention.

*Example 1*

22 cc. of concentrated nitric acid were added to 4.8 g. of arsenous oxide, and were dissolved under heating. This solution was then concentrated to dryness, followed by the addition of 500 cc. of water to make a solution. 6.3 g. of ammonium meta-vanadate were dissolved therein. 50 g. of purified diatom earth were then mixed therewith to render it paste-like, and thereafter dried and shaped. The shaped material was then heated in air for 6 hours at a temperature of 350° C.

A reaction vessel heated in a salt bath was charged with a catalyst prepared in the manner mentioned above, and while introducing a gaseous mixture comprising 1.1% by volume of para-chlorotoluene, 2.0% by volume of ammonia and 96.9% by volume of air, reaction was carried out at a temperature of 352° C., the contact time being 2.7 seconds.

In the early stage of the reaction, 70.3% of para-chlorotoluene were converted to para-chlorobenzonitrile. In this case, the yield based on the consumed ammonia was 62.3 mole percent. The reaction was further continued for 300 hours to give para-chlorobenzonitrile in a yield of 66.7 mole percent based on para-chlorotoluene.

*Control.*—For the sake of comparison, the conventional vanadium oxide catalyst in which an oxide of arsenic is not incorporated was used.

7.5 g. of ammonium metavanadate were dissolved in 130 cc. of water under heating, followed by the addition of 50 g. of purified diatom earth to render the mixture paste-like. Thereafter, it was dried and shaped. It was further heated in air for 6 hours at a temperature of 350° C.

Using the thus prepared catalyst, the reaction was carried out at a temperature of 350° C., the contact time being 2.7 seconds in the same manner as in Example 1.

Thus, 57.6 mole percent of the fed para-chlorotoluene were converted to para-benzonitrile in a yield of 31.1 mole percent based on the consumed ammonia.

Example 2

A catalyst was prepared in the same manner as in Example 1 except that 5.0 g. of rubidium chloride were added.

A reaction vessel heated in a salt bath was charged with the thus prepared catalyst, and while introducing a gaseous mixture comprising 1.3% by volume of para-chlorotoluene, 2.6% by volume of ammonia and 96.1% by volume of air, reaction was carried out at a temperature of 360° C., the contact time being 2.7 seconds. Thus, 77.3 mole percent of theoretical amount of para-chlorobenzonitrile were obtained based on the fed para-chlorotoluene. The yield based on the consumed ammonia was 68.0 mole percent. The amount of carbon dioxide formed came down to about ⅔ as compared with Example 1. The lowering of catalytic activity was not observed even after 321 hours of reaction.

Example 3

4.2 g. of arsenic oxide were dissolved in 60 cc. of water. Into this solution, 3.3 g. of ammonium metavanadate were dissolved under heating. Then, 2.5 g. of potassium sulphate were dissolved therein, followed by the addition thereto of 70 g. of purified diatom earth to render the mixture paste-like. After drying, it was shaped. Subsequently, the catalyst was heat-treated in air at a temperature of 350° C. for 12 hours.

A reaction vessel heated in a salt bath was charged with the thus prepared catalyst, and while introducing a gaseous mixture comprising 1.3% by volume of isopropylbenzene, 2.5% by volume of ammonia and 96.2% by volume of air, reaction was carried out at a temperature of 365° C., the contact time being 3.6 seconds.

In this manner, 78.2 mole percent of the fed isopropylbenzene were converted to benzonitrile, with hardly any formation of a colouring substance. The yield based on the consumed ammonia was 70.1 mole percent.

Example 4

Using the catalyst and the reaction vessel of Example 3, reaction was carried out at a temperature of 375° C., the contact time being 2.1 seconds, while introducing a gaseous mixture comprising 2.0% by volume of styrene, 4.0% by volume of ammonia and 94.0% by volume of air.

Thus, 86.8 mole percent of the fed styrene were converted to benzonitrile, and the yield based on the consumed ammonia was 71.9 mole percent.

Example 5

9.2 g. of vanadyl sulphate were added to 50 cc. of an aqueous solution mixture of 6.2 g. of arsenic oxide and 4.2 g. of lithium hydroxide. 55 g. of titanium oxide were added to the obtained mixture to render it paste-like. After it was evaporated to dryness, the mixture was shaped, followed by heat treatment in air at a temperature of 350° C. for 16 hours.

A reaction vessel heated in a salt bath was charged with the thus obtained catalyst, and while introducing a gaseous mixture comprising 1.1% by volume of meta-tolunitrile, 2.0% by volume of ammonia and 96.9% by volume of air, reaction was carried out at a temperature of 392° C., the contact time being 1.3 seconds.

Thus, 86.8 mole percent of the fed meta-tolunitrile were converted to pure white isophthalonitrile. The yield based on the consumed ammonia was 74.1 mole percent.

Example 6

Using the catalyst and the reaction vessel of Example 3, reaction was carried out at a temperature of 383° C., the contact time being 2.5 seconds, while introducing a gaseous mixture comprising 1.5% by volume of meta-xylene, 5.5% by volume of ammonia and 93.0% by volume of air.

Thus, 75.8 mole percent of the fed meta-xylene were converted to pure white isophthalonitrile and 11.8 mole percent of the meta-xylene, to meta-tolunitrile. The yield based on the consumed ammonia was 73.8 mole percent.

Example 7

Using the catalyst and the reaction vessel of Example 5, reaction was carried out at a temperature of 390° C., the contact time being 2.5 seconds, while introducing a gaseous mixture comprising 1.5% by volume of meta-xylene containing 32.1% of para-xylene, 7.5% by volume of ammonia and 91.0% by volume of air.

Thus, 83.5 mole percent of the fed xylene were converted to phthalonitriles and 3.3 mole percent, to tolunitriles. The yield based on the consumed ammonia was 75.8 mole percent.

Example 8

A catalyst was prepared in the same procedure as in Example 1 except that 0.51 g. of sodium hydroxide was added.

A reaction vessel heated in a salt bath was charged with the thus prepared catalyst, and while introducing a gaseous mixture comprising 1.5% by volume of ethylbenzene, 3.0% by volume of ammonia and 95.5% by volume of air, reaction was carried out at a temperature of 372° C. the contact time being 2.5 seconds. Thus, 88.1 mole percent of ethylbenzene were converted to benzonitrile. The yield based on the consumed ammonia was 72.5 mole percent.

When 0.72 g. of sodium phosphate or 2.3 g. of borax were used instead of sodium hydroxide in this example, there were obtained benzonitrile in a yield of 86.9 mole percent or 87.7 mole percent respectively based on the fed ethylbenzene. The yield based on the consumed ammonia was 70.5 mole percent or 71.9 mole percent respectively.

As noted in the examples, above, all nitrile (—C≡N) groups are attached directly to the aromatic ring.

We claim:
1. A process for the production of aromatic nitriles, wherein all nitrile groups are attached directly to the aromatic ring, which comprises contacting at a temperature in the range of 250 to 500° C. a gaseous mixture containing (1) at least one substituted benzene represented by the general formula:

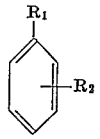

wherein $R_1$ repersents a loweralkyl group and a lower alkenyl group; $R_2$ represents hydrogen atom, a lower alkyl group, a lower alkenyl group or a cyano group; and the benzene nucleus being optionally further substituted by halogen (2) ammonia and (3) molecular oxygen-containing gas with a catalyst composition consisting essentially of an oxide of arsenic and an oxide of vanadium supported on an inert carrier wherein the atomic ratio of arsenic to vanadium being between 5:1 and 1:3, the concentration of the substituted benzene in said gaseous mixture being in the range of 0.5 to 10% by volume, the amount of ammonia in said gaseous mixture being at least one mol to one mol of the alkyl or alkenyl group in the substituted benzene, and the amount of molecular oxygen in said gaseous mixture being at least 1.5 times the theoretical ratio for stoichiometric reaction to form the nitriles.

2. A process for the production of aromatic nitriles, wherein all nitrile groups are attached directly to the aromatic ring, which comprises contacting at a temperature in the range of 250 to 500° C. a gaseous mixture containing (1) at least one substituted benzene represented by the general formula:

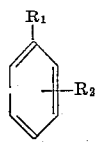

wherein $R_1$ represents a lower alkyl group or a lower alkenyl group; $R_2$ represents hydrogen atom, a lower alkyl group, a lower alkenyl group or a cyano group; and the benzene nucleus being optionally further substituted by halogen (2) ammonia and (3) molecular oxygen-containing gas with a catalyst composition consisting essentially of an oxide or arsenic, an oxide of vanadium and at least one alkali metal compound selected from the group consisting of hydroxide, chloride, sulfate, phosphate and borate supported on an inert carrier wherein the atomic ratio of arsenic to vanadium lies between 5:1 and 1:3, and wherein the atomic ratio of alkali metal to arsenic lies between 0.1:1 and 5:1, the concentration of the substituted benzene in said gaseous mixture being in the range of 0.5 to 10% by volume, the amount of ammonia in said gaseous mixture being at least one mol to one mol of the alkyl or alkenyl group in the substituted benzene and the amount of molecular oxygen in said gaseous mixture being 1.5 times the theoretical ratio for stoichiometric reaction to form the nitriles.

3. The process in accordance with claim 1 wherein the substituted benzene in toluene.

4. The process in accordance with claim 1 wherein the substituted benzene is xylene.

5. The process in accordance with claim 1 wherein the substituted benzene is a mixture of xylenes.

6. The process in accordance with claim 1 wherein the substituted benzene is tolunitrile.

References Cited
UNITED STATES PATENTS

| | | | |
|---|---|---|---|
| 2,833,807 | 5/1958 | Farkas | 260—465 |
| 3,041,368 | 6/1962 | Lind | 260—465 |
| 3,278,573 | 10/1966 | Kroeper et al. | 260—465 |
| 3,287,394 | 11/1966 | Young et al. | 260—465.3 |
| 3,293,279 | 12/1966 | Young et al. | 260—465.3 |
| 3,293,280 | 12/1966 | Young et al. | 260—465.3 |

JOSEPH P. BRUST, *Primary Examiner.*